July 22, 1969          P. SOUCY          3,457,359
ELECTRICALLY GROUNDED HOSE
Filed June 6, 1966
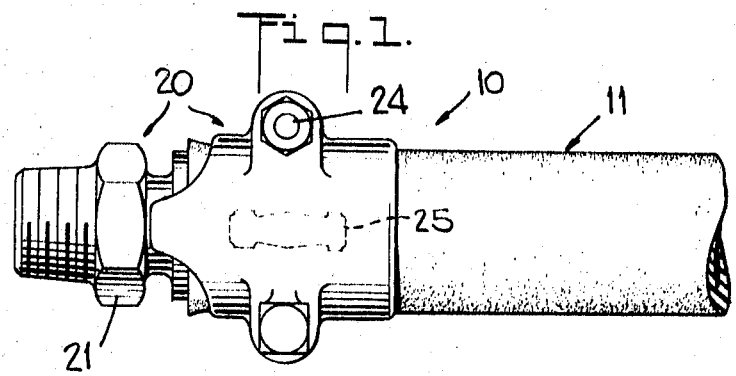
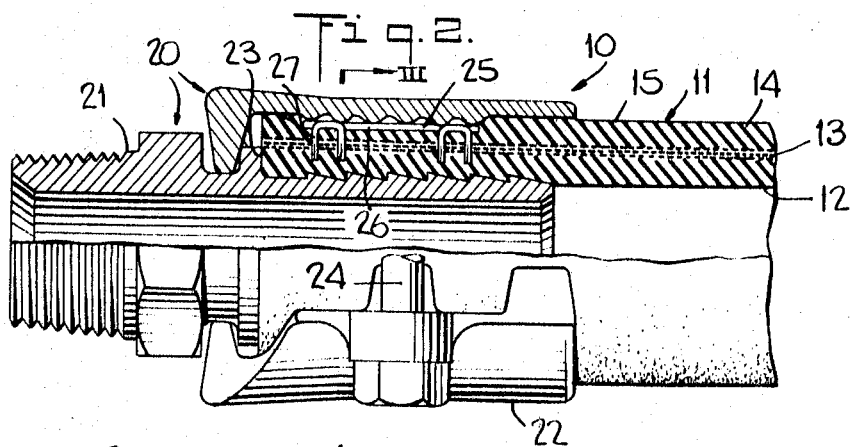
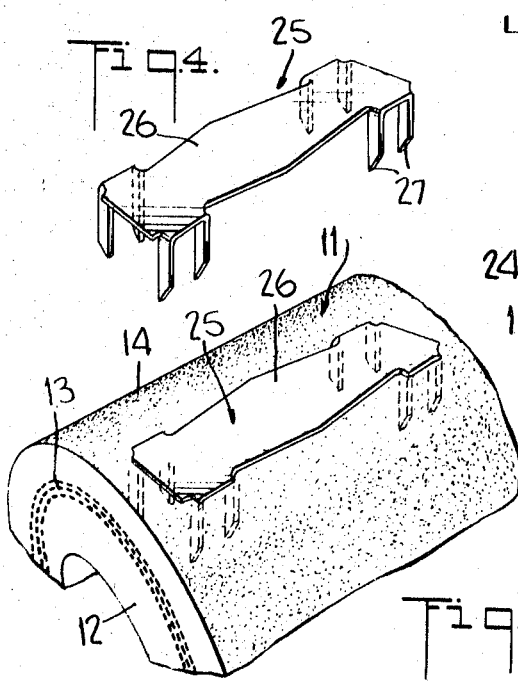
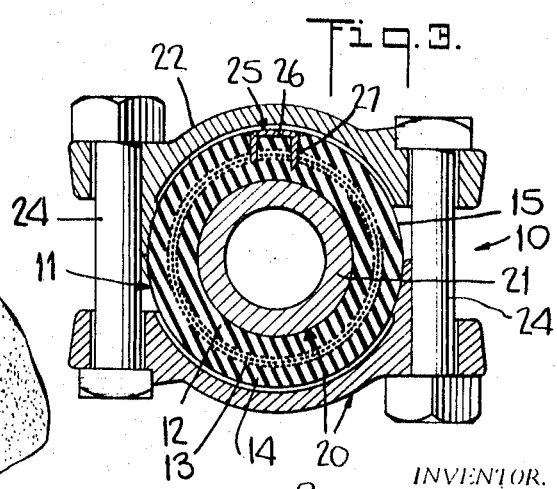
INVENTOR.
PHILIPPE SOUCY
BY
Harvey E Bumgardner, Jr.
ATTORNEY

United States Patent Office 3,457,359
Patented July 22, 1969

---

3,457,359
ELECTRICALLY GROUNDED HOSE
Philippe Soucy, Montreal, Quebec, Canada, assignor to Uniroyal, Inc., New York, N.Y., a corporation of New Jersey
Filed June 6, 1966, Ser. No. 555,511
Int. Cl. H01b 7/30
U.S. Cl. 174—47                    6 Claims

ABSTRACT OF THE DISCLOSURE

A wire reinforced rubber hose provided, at at least one end thereof, with an electrically conductive member having a flat element lying adjacent the outer hose covering and having one or more sharp prongs extruding normal to the plane of the flat element to locally penetrate the outer hose covering and to locally penetrate and contact the wire reinforcement, whereby static electrical charges resulting from operational use of the hose may be grounded through the wire reinforcement and conductive element, via a hose coupling, to the connected piping or vessel.

---

This invention relates to a novel and simplified means for statically grounding wire braid reinforced hose as well to a wire braid reinforced hose end so grounded.

Wire braid reinforced rubber hose has, in the past, been used in many applications. In some of these, high pressure steam service for example, the hose, unless grounded, tends to build up a charge of static electricity. Such a static charge build-up is dangerous in that it may cause electrical shocks to persons handling the hose and may, in some environments, result in sparks creating an explosion hazard when the charge is ultimately grounded.

In the prior art, this static charge build-up problem has been dealt with by providing, within the hose structure, a separate grounding conductor or wire running lengthwise of the hose. This grounding arrangement has required a stripping of the grounding conductor and attachment thereof to the hose end couplings. Further, it has proven less than satisfactory because of in-service breakage of the grounding conductor due to flexure of the hose and the stress caused by such impacts as vehicles running over the hose. In effect, the grounding wire and its connections to the hose couplings have constituted the "Achilles' heel" of the entire hose.

The instant invention solves this problem by utilizing, as a grounding conductor, what is inherently the strongest element of the hose, that is, the wire braid reinforcing layer forming part of the basic hose structure. Further, it obviates the necessity of stripping the wire braid grounding conductor to electrically connect the same to a hose end coupling and provides a strong, failure proof electrical connection between the hose and the electrical ground.

Accordingly, it is an object of this invention to provide new and improved means for statically grounding wire braid reinforced hose.

It is a further object of this invention to provide a new and improved statically grounded hose end assembly.

Another object of this invention is to provide a means, useable with a wide variety of hose end couplings, for statically grounding wire braid reinforced hose.

Yet another object of this invention is to provide means for locally penetrating the outer covering of a wire braid reinforced hose to statically ground the same without the necessity of severing said covering or of stripping bare the wire braid layer.

Other objects and advantages of the present invention will become apparent from the following description when read in conjunction with the accompanying drawings wherein:

FIG. 1 is a plan view of a hose end assembly in accordance with the invention.

FIG. 2 is a partially sectioned elevation view of the assembly shown in FIG. 1.

FIG. 3 is a transverse sectional view taken on line III—III of FIG. 2.

FIG. 4 is an isometric view of the hose penetrating member of the invention.

FIG. 5 is a partial isometric view of a wire braid reinforced hose end showing the hose penetrating member of FIG. 4 driven thereinto.

Referring now to the drawings, wherein like reference numerals denote corresponding parts throughout the several views, FIGS. 1 and 2 depict a statically grounded hose end assembly 10 of the present invention. The hose end shown is one end of a typical wire braid reinforced rubber hose 11 including a fluid impervious tubular rubber lining layer 12, a wire braid reinforcing layer 13 exterior of said lining layer and a tubular rubber outer covering layer 14 exterior of said reinforcing layer. Although not shown in the drawings, one or more layers of fabric may also be present in such a typical hose construction.

Also shown in FIGS. 1, 2 and 3 is a typical hose coupling 20 comprising a tubular threaded fitting 21 inserted into the end of the hose 11 and a bolted clamp 22 surrounding the hose 11 and clamping it to the fitting 21. Typical of such hose couplings in common use are those disclosed in U.S. Patent No. 2,166,524 to Goodall and in U.S. Patent No. 2,944,841 to Carpenter. From FIG. 2 it will be observed that there is no direct electrical contact between the wire braid layer 13 of the hose 11 and the tubular fitting 21 aside from a possible chance butt-end contact of the wire braid 13 against the shoulder 23.

A positive electrical contact between the wire braid layer 13 of the hose 11 and the fitting 21 is provided by the member 25, best shown in FIGS. 2 and 4, in conjunction with the clamp 22. The member 25 has a generally flat portion or body 26 and is provided with one or more sharp prongs 27 extending from one flat surface of the body 26 in a direction normal to the plane thereof. An eight pronged member 25 is illustrated in the drawings. The prongs 27 should be of sufficient length to penetrate the outer covering layer 14 and the wire braid layer 13 of the hose 11 and of sufficient thickness above the point to spread and firmly contact the wire braid 13 when the member 25 is driven prong first into the hose 11 to such a depth that the body 26 is in contact with the outer surface 15 of the hose 11.

In assembling the hose end assembly shown in FIGS. 1, 2 and 3 the member 25 is first driven, prong first, into the hose 11 as shown in FIG. 4 with a mallet until the body 26 lies flat against the outer surface 15 of the hose 11. While the member 25 should be driven into the hose 11, as shown in the drawings, near or reasonably adjacent to the end thereof, axial location is not critical and the member 25 may be visually positioned. Next the fitting 21 is inserted into the hose 11 until the end of the hose 11 butts against the shoulder 23. Finally, the clamp 22 is applied over and in contact with the member 25 and the fitting 21 as well as the hose 11 and is tightened down by means of the bolts 24 until the hose 11 is firmly clamped to the fitting 21 and the member 25 is firmly contacted by the clamp 22 thereby completing the grounding circuit from the wire braid 13 through the member 25 and clamp 22 to the fitting 21.

Alternatively, and particularly if it is desired to utilize prongs 27 sufficiently long to penetrate the entire wall thickness of the hose 11, the fitting 21 may be inserted into the hose 11 before the member 25 is driven into it. In this instance the prongs 27 will locally penetrate and contact the wire braid layer 13 and will bend in contact with the fitting 11.

While the expressions, "grounding circuit," "grounding means" and "grounded hose end assembly" are generally employed herein to denote the structure described, it will be appreciated that the hose end assembly 10 described herein must actually be connected, either directly or through similarly constructed hose, to an electrical ground before the circuit is complete. This would be true in most if not all "in service" conditions which would tend to generate a static charge on the hose 11.

While a preferred form of the invention has been shown and described, it will be appreciated that this is for purposes of illustration and that modifications and changes may be made therein without departing from the spirit and scope of the invention.

Having thus described my invention, what I claim and desire to protect by Letters Patent is:

1. A wire reinforced high pressure hose having a tubular, fluid-impervious liner layer, a wire reinforcing layer comprised of closely spaced parallel wires extending helically around the circumference of said liner layer from one end of said hose to the other and a covering layer surrounding said reinforcing layer; said hose being provided adjacent at least one end thereof with means comprising: a metallic member having a substantially flat body and at least one sharp prong extending from said body in a direction substantially normal to the plane thereof; each said prong being longer than the combined thickness of said covering layer and said reinforcing layer of said hose; said member being embedded, prong first, into said hose to a depth such that said body lies flat against the outer surface of said hose and each said prong locally penetrates and contacts said wire reinforcing layer 2. The hose of claim 1 wherein each said prong is, additionally, shorter than the entire wall thickness of said hose.

3. A hose end assembly for statically grounding wire reinforced high pressure hose comprising: a length of wire reinforced hose having a tubular, fluid-impervious liner layer, a wire reinforcing layer comprised of closely spaced parallel wires extending helically around the circumference of said liner layer from one end of said hose to the other and a covering layer surrounding said reinforcing layer; a metallic member having a substantially flat body and at least one sharp prong extending from said body in a direction substantially normal to the plane thereof; each said prong being longer than the combined thickness of said covering layer and reinforcing layer of said hose; said member being embedded, prong first, into said hose adjacent one end thereof to a depth such that said body lies flat against the outer surface of said hose and each said prong locally penetrates and contacts said wire reinforcing layer; and coupling means attached to said end of said hose in contact with said member.

4. The assembly of claim 3 wherein each said prong is, additionally, shorter than the entire wall thickness of said hose.

5. The assembly of claim 3 wherein said coupling means comprises a tubular fitting inserted in said end of said hose and exterior clamping means for contacting said fitting and said member.

6. The assembly of claim 5 wherein each said prong is, additionally, shorter than the entire wall thickness of said hose.

References Cited

UNITED STATES PATENTS

| 2,117,308 | 5/1938 | Frey | 85—13 |
| 2,797,111 | 6/1957 | Beazley | 285—243 X |
| 3,042,737 | 7/1962 | Brumbach et al. | 174—78 X |

FOREIGN PATENTS

| 414,303 | 6/1910 | France. |

LARAMIE E. ASKIN, Primary Examiner

U.S. Cl. X.R.

85—13; 174—78; 285—243; 317—2; 339—97